United States Patent
Hung

(10) Patent No.: US 6,409,518 B1
(45) Date of Patent: Jun. 25, 2002

(54) PERSONAL COMPUTER ADD-ON CARD STABILIZER

(75) Inventor: Kuo-Chuan Hung, Lu-Chou (TW)

(73) Assignee: Chun Long Metal Co., Ltd., Lu-Chou (TW)

( * ) Notice: Subject to any disclaimer, the term of this patent is extended or adjusted under 35 U.S.C. 154(b) by 0 days.

(21) Appl. No.: 09/816,332

(22) Filed: Mar. 26, 2001

(51) Int. Cl.[7] ............................................. H01R 12/00
(52) U.S. Cl. ........................................ 439/61; 361/801
(58) Field of Search ..................... 439/61; 437/631; 361/759, 801, 807

(56) References Cited

U.S. PATENT DOCUMENTS 5,632,066 A * 5/1997 Huong ........................ 16/338
5,822,193 A * 10/1998 Summers et al. ........... 361/759

* cited by examiner

Primary Examiner—Gary Paumen
Assistant Examiner—James R. Harvey
(74) Attorney, Agent, or Firm—Jacobson Holman, PLLC

(57) ABSTRACT

A persona computer add-on card stabilizer comprising a transverse rod in the rear portion inside a computer case and above the add-on card slot, a plurality of mounting rings on the transverse rod to prevent the corresponding add-on cards from popping up.

1 Claim, 3 Drawing Sheets

PERSONAL COMPUTER ADD-ON CARD STABILIZER

BACKGROUND OF THE INVENTION

I. Field of the Invention

This invention relates generally to a personal computer add-on card stabilizer and, more specifically, a personal computer add-on card stabilizer that utilizes a transverse rod and a plurality of mounting rings to prevent the peripheral add-on cards inside a personal computer from moving and popping up.

II. Description of the Prior Art

Heretofore, personal computer has expansion slots for different add-on cards with different applications. VL is an earlier specification while ISA (Industry Standard Architecture) and PCI (Peripheral Connection Interface) specifications are used today. A peripheral add-on card is plugged in an expansion slot of the mainboard and fixed by means that a mounting plate is screwed on the case.

However, the expansion slot is relatively long. When an add-on card is plugged in the expansion slot and fixed on the case with only a screw, the add-on cards tend to pop up during transportation and the front portion of add-on cards might move up to cause a bad contact or disconnection, thereby resulting in malfunction of this personal computer. If it happens to a display card at power up time, no display to indicate any signal will confuse the users.

The present invention improves on the heretofore known problem by providing a personal computer add-on card stabilizer. The personal computer add-on card stabilizer is composed of a transverse rod with a plurality of mounting rings on the transverse rod to prevent the corresponding add-on cards from popping up.

SUMMARY OF THE INVENTION

It is therefore a primary object of the invention to provide a personal computer add-on card stabilizer comprising a transverse rod in the rear portion inside a computer case and above the add-on card slot, and a plurality of mounting rings on the transverse rod to prevent the corresponding add-on cards from moving and popping up.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
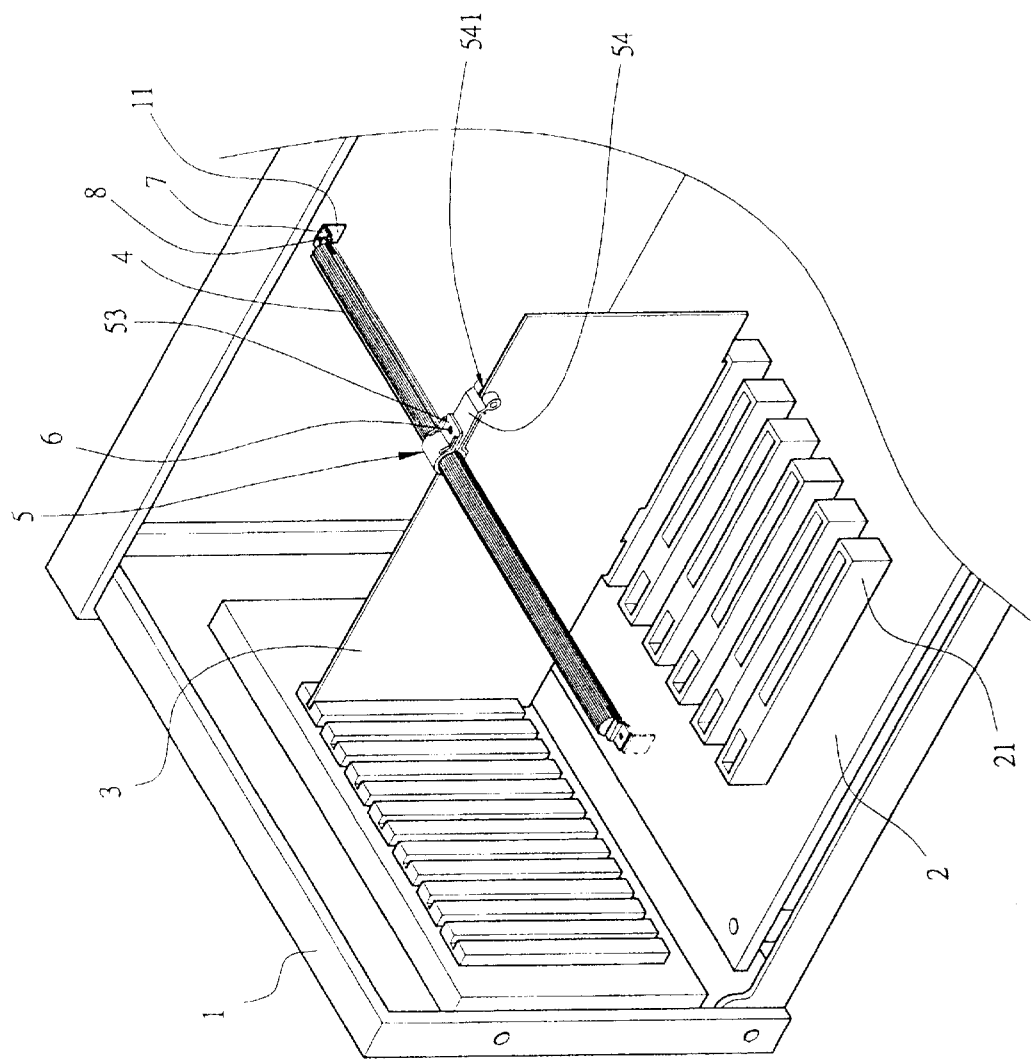
FIG. 1 is a perspective view of the present invention.
Figure 2:
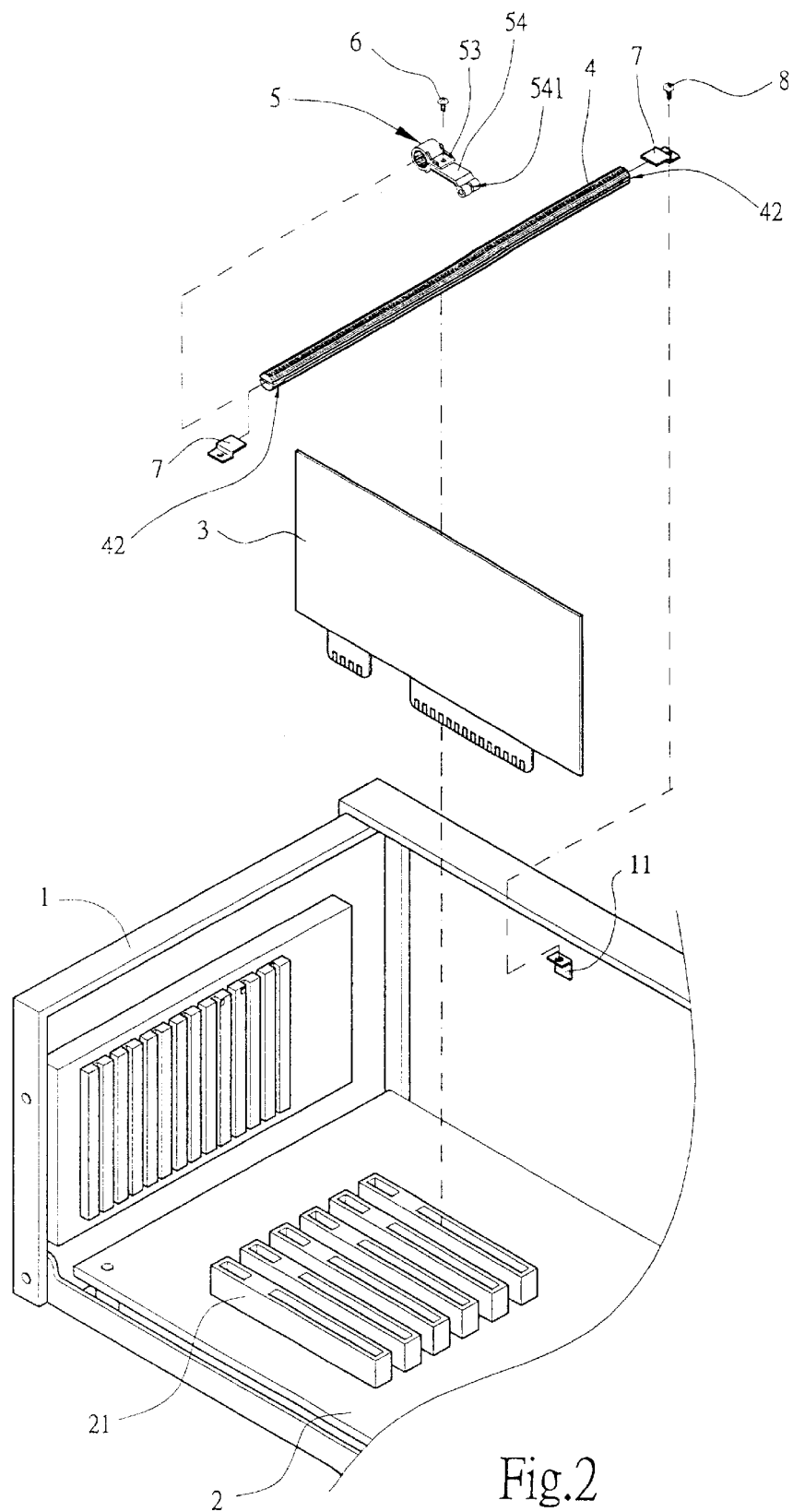
FIG. 2 is an exploded view of an embodiment of the present invention.
Figure 4:
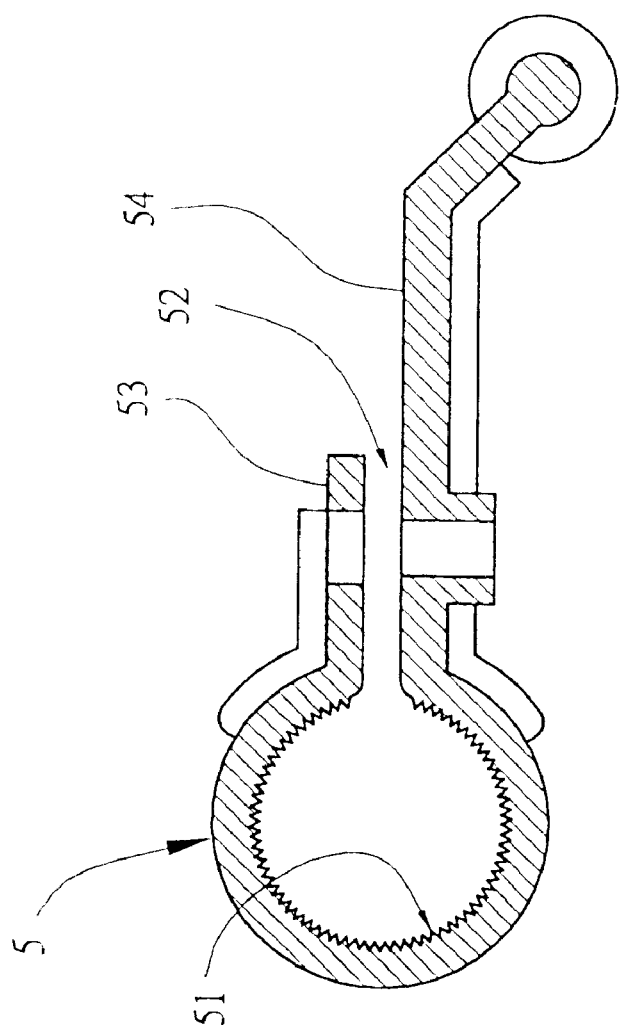
FIG. 4 is a sectional view of the mounting ring of the present invention.
Figure 3:
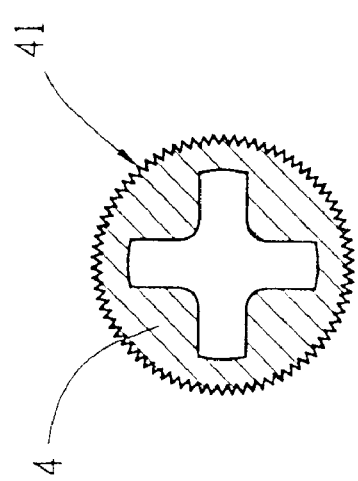
FIG. 3 is a sectional view of the transverse rod of the present invention.

Referring to FIG. 1 and FIG. 2 the present invention is composed of a transverse rod 4, which is located inside of a computer case 1 and above expansion slots 3 of a mainboard 2. The transverse rod 4 is fitted with zigzag notches 41 on the outer circumference thereof, as shown in FIG. 3. A plurality of mounting rings 5 wrap around the transverse rod 4. Zigzag notches 51 on the inner circumference of the mounting ring 5 correspond to the zigzag notches 41 of the transverse rod 4 for fixing the mounting rings 5 on transverse rod 4. Referring to FIG. 4, the mounting ring 5 has an opening 52, and an upper edge 53 and a fastening arm 54 is situated on the top and bottom of the opening 52. A small slot 541 is located at the end of the fastening arm 54. the top of add-on card 3 can be inserted into the small sot 541. A screw 6 passes through the upper edge 53 and the fastening arm 54 to fasten the mounting ring 5 firmly on transverse rod 4. The fastening arm 54 is on the top of the add-on card 3 and presses it firmly from moving and popping up.

Based on above description, the transverse rod 4 is installed on the rear of computer case 1 and above the expansion slots 21 of the mainboard 2. The mounting ring 5 wraps around the transverse rod 4 by pulling the opening 52 wider. The mounting ring 5 is moved to top of an add-on card 3, press the fastening arm 54 to the add-on card 3 and inlay the small slot 541 to the top of add-on card 3. Pass the screw 6 over the upper edge 53 to the fastening arm 54 to fasten the mounting ring 5 on the transverse rod 4. Accordingly, the add-on card 3 can be fixed for prevention from bad contact or disconnection by transportation vibration.

The fastening arm 54 of mounting ring 5 can be adjusted up and down to adapt to the different height of the different add-on cards 3.

The mounting ring 5 is in zigzag connection with the transverse rod 4 so that the mounting ring 5 can not move up and down but to the right and left for reaching the connect position for the add-on cards 3.

Once a new add-on card is placed a mounting ring 5 can be added respectively, this offers flexibility and convenience.

Referring to FIG 1, a pair of mounting brackets 11 is welded on the computer case 1 where the transverse rod 4 is mounted. On both ends of transverse rod 4 are a pair of flat apertures 42. A connection plate 7 can be inserted into the flat aperture 42 of the transverse rod 4 while a screw 8 passes through the connection plate 7 and the mounting bracket 11 to the transverse rod 4 for a firm fixing on computer case 1.

While a preferred embodiment of the invention has been shown and described in detail, it will be readily understood and appreciated that numerous omissions, changes and additions may be made without departing from the spirit and scope of the invention.

What is claimed is:

1. A personal computer add-on card stabilizer comprising:

a transverse rod being inside of a computer case and above the expansion slot location of a mainboard, said transverse rod being fitted with zigzag notches externally;

a plurality of mounting rings wrapping around said transverse rod, zigzag notches being formed on the inner circumference of said mounting rings, said mounting ring having an opening, an upper edge and a fastening arm while said upper edge and said fastening arm are formed on the top and bottom of said opening, a small slot being located at the end of said fastening arm, a top of the add-on card inlaying into said small slot, a screw passing through said upper edge to said fastening arm to fasten said mounting ring firmly on said transverse rod, said fastening arm being on the top of the add-on card, thereby pressing the add-on card firmly; and a connection plate inserted into a flat aperture of said transverse rod, a screw passing through said connection plate and a mounting bracket to said transverse rod for a firm fixing to computer case.

* * * * *